US011470495B2

(12) United States Patent
Bajko

(10) Patent No.: US 11,470,495 B2
(45) Date of Patent: Oct. 11, 2022

(54) WI-FI MEASUREMENT REPORT ENHANCEMENT TECHNIQUES

(71) Applicant: MEDIATEK INC., Hsin-Chu (TW)

(72) Inventor: Gabor Bajko, San Jose, CA (US)

(73) Assignee: MEDIATEK INC.

( * ) Notice: Subject to any disclaimer, the term of this patent is extended or adjusted under 35 U.S.C. 154(b) by 0 days.

(21) Appl. No.: 17/039,645

(22) Filed: Sep. 30, 2020

(65) Prior Publication Data

US 2021/0022029 A1  Jan. 21, 2021

Related U.S. Application Data

(63) Continuation of application No. 15/974,470, filed on May 8, 2018, now Pat. No. 10,805,819.

(60) Provisional application No. 62/503,368, filed on May 9, 2017.

(51) Int. Cl.
*H04W 24/10* (2009.01)
*H04W 88/10* (2009.01)
*H04W 48/16* (2009.01)
*H04W 36/00* (2009.01)

(52) U.S. Cl.
CPC .......... *H04W 24/10* (2013.01); *H04W 48/16* (2013.01); *H04W 88/10* (2013.01); *H04W 36/0088* (2013.01)

(58) Field of Classification Search
CPC ..... H04W 88/10; H04W 48/16; H04W 24/10; H04W 36/0088
USPC ........................................................ 370/329
See application file for complete search history.

(56) References Cited

U.S. PATENT DOCUMENTS

| | | | | |
|---|---|---|---|---|
| 8,995,407 B2* | 3/2015 | Meylan | ................. | H04W 48/18 |
| | | | | 370/336 |
| 9,210,625 B1* | 12/2015 | Lovlekar | ................ | H04W 24/08 |
| 9,232,408 B2* | 1/2016 | Richards | ........... | H04W 36/0088 |
| 9,467,818 B2* | 10/2016 | O'Brien | ................ | H04W 48/10 |
| 9,629,117 B2* | 4/2017 | Bajko | ................... | H04W 64/00 |
| 9,661,659 B2* | 5/2017 | Choi | ................. | H04W 74/0816 |
| 9,826,426 B2* | 11/2017 | Montemurro | ......... | H04W 24/08 |
| 9,872,233 B2* | 1/2018 | Jeon | ...................... | H04W 16/14 |
| 10,009,893 B2* | 6/2018 | Wang | ................. | H04W 72/085 |

(Continued)

FOREIGN PATENT DOCUMENTS

| | | |
|---|---|---|
| CN | 102282884 A | 12/2011 |
| CN | 105144783 A | 12/2015 |

(Continued)

OTHER PUBLICATIONS

Standard for Information technology—Telecommunications and information exchange between systems Local and metropolitan area networks—Specific requirements, Part 11: Wireless LAN Medium Access Control (MAC) and Physical Layer (PHY) Specifications, IEEE Std 802.11-2016 (Revision of IEEE Std 802.11-2012), IEEE, USA, Dec. 14, 2016, p. 194 +pp. 1699-1715, XP068113034.

(Continued)

*Primary Examiner* — Man U Phan

(57) ABSTRACT

Radio management reporting techniques can allow a reporting station to send measurement parameters in one or more radio management frames. The receiving station can receive the radio management measurement parameters within a requested time period and/or can determine when the last requested radio management measurement parameter has been received.

15 Claims, 8 Drawing Sheets

(56) References Cited

U.S. PATENT DOCUMENTS

| | | | |
|---|---|---|---|
| 2007/0002806 A1 | 1/2007 | Soomro | |
| 2008/0161011 A1* | 7/2008 | Babin | H04W 4/029 |
| | | | 455/456.1 |
| 2015/0181552 A1 | 6/2015 | Bajko | |
| 2015/0264597 A1* | 9/2015 | Zhang | H04W 28/0289 |
| | | | 370/232 |
| 2015/0351115 A1 | 12/2015 | Jeon et al. | |
| 2016/0037418 A1 | 2/2016 | Burbidge et al. | |
| 2016/0173662 A1* | 6/2016 | Seok | H04L 1/1896 |
| | | | 370/252 |

FOREIGN PATENT DOCUMENTS

| | | |
|---|---|---|
| CN | 106165495 A | 11/2016 |
| CN | 106256146 A | 12/2016 |
| CN | 106470444 A | 3/2017 |
| CN | 106537810 A | 3/2017 |
| CN | 106550444 A | 3/2017 |
| EP | 2725846 A1 | 8/1996 |
| GB | 2521442 A | 6/2015 |
| JP | 2009-506698 A | 2/2009 |
| JP | 2010-11261 A | 1/2010 |
| JP | 2010-520667 A | 6/2010 |
| WO | 2014175677 A1 | 10/2014 |

OTHER PUBLICATIONS

Gabor Bajko et al., IEEE P802.11 Wireless LANs, Enhancement to Beacon Report, Jul. 28, 2018, doc.: IEEE 802.11/0971r3.

"Wireless LAN Medium Access Control (MAC) and Physical Layer (PHY) Specification", IEEE Computer Society, {IEEE Standards Association} 2016.

* cited by examiner

WI-FI MEASUREMENT REPORT ENHANCEMENT TECHNIQUES

CROSS-REFERENCE TO RELATED APPLICATIONS

This application is a continuation of U.S. patent application Ser. No. 15/974,470, filed May 8, 2018, which is now granted U.S. Pat. No. 10,805,819 granted Oct. 13, 2020, and claims the benefit of U.S. Provisional Patent Application No. 62/503,368 filed May 9, 2017, which are incorporated herein in their entirety.

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, smart phones, servers, and the like have facilitated increased productivity and reduced costs in communicating and analyzing data in most areas of entertainment, education, business, and science. One common aspect of computing systems is Wi-Fi communication networks. A Wi-Fi network allows computing devices of all different types to communicative with each other.

The Wi-Fi standard (IEEE 802.11) is a set of Media Access Control (MAC) and Physical Layer (PHY) specifications for implementing wireless communication links. A number of management reports are exchanged to configure and manage the Media access control and physical layer. The data transmitted in management reports can be used in the media access control and physical layer to manage connections between devices, congestion on the communication channels, interference in the spectrum of the communication channels, and the like. As the popularity of Wi-Fi increases, it is desirable for the media access control and physical layer to support larger numbers of computing devices of increasingly different device types on networks with high congestion and increased interference. Accordingly, there is a continuing need for enhanced measurement and reporting techniques that provide for interoperability and backward compatibility.

SUMMARY OF THE INVENTION

The present technology may best be understood by referring to the following description and accompanying drawings that are used to illustrate embodiments of the present technology directed toward enhanced wireless measurement reporting techniques.

In one embodiment, a requesting station can generate a measurement report request along with a last measurement report indication request. The measurement report request can be encoded by the requesting station along with the last measurement report indication request in a radio management frame. The encoded radio management frame can be transmitted form the requesting station to one or more reporting stations.

A reporting station can decode the measurement report request along with a last measurement report indication request from the received radio management frame. In response to the measurement report request, the reporting station can measure one or more parameters. The one or more measured parameters can be encoded by the reporting station in one or more measurement report responses in one or more radio management frames. A given response element in a last one of the one or more radio management frames can be encoded to include a last measurement report indication. The last measurement report indication can be encoded in a given sub-element of the radio management frames. If a particular radio management frame does not include a last measurement report, the given sub-element for the last measurement report indication can be set to a first value. If the particular radio management frame includes the last measurement report, the given sub-element can be set to a second value. The encoded one or more radio management frames can be transmitted from the reporting station to the requesting station.

The requesting station can decode the received radio management frames from a given responding station and find the frame which contains the last measurement report response based on the last measurement report indication. The requesting station can then configure one or more parameters for communicating on one or more wireless communication links based on the one or more received measurement report elements as soon as it received the last measurement report frame, and does not need to wait to see if additional measurement report frames are to be received. Accordingly, the requesting station can determine when the last requested radio management measurement parameter has been received from the inclusion of the last measurement report indication in a last one of one or more radio management frames.

The measurement report can be a beacon report, a spectrum report, a radio measurement report, a neighbor measurement report, a channel measurement report, and a transmit stream measurement report. In an exemplary embodiment, the measurement report request can be a beacon report request and the measurement report response can be a beacon request response. In such case, a last beacon report indication request can be encoded as a given sub-element with a length field of one (1) of the beacon report request. When the given sub-element has a value of one (1), a last beacon report indication is requested. Similarly, a last beacon report indication can be encoded as a given sub-element with a length field of one (1) of the beacon report response. When the given sub-element has a value of one (1), a last beacon report is indicated.

In another embodiment, a requesting station can generate a measurement report request along with a measurement report response duration request. The measurement report request can be encoded along with the measurement report response duration request in the radio management frame. The encoded radio management frame can be transmitted form the requesting station to one or more reporting stations.

A reporting station can decode the measurement report request along with the measurement report response duration request from the received radio management frame. In response to the measurement report request, the reporting station can measure one or more parameters. The one or more measured parameters can be encoded by the reporting station in one or more measurement report responses in one or more radio management frames. The encoded one or more radio management frames can be transmitted from the reporting station to the requesting station within a duration indicated by the measurement report response duration request.

The requesting station can decode the one or more measurement report responses from the one or more received radio management frames. The requesting station can then configure one or more parameters for communicating on one or more wireless communication links based on the one or more received measurement report responses as soon as it received the last measurement report frame, and does not need to wait to see if additional measurement report frames are to be received. Accordingly, the requesting station can receive the measurement report responses within a requested time period as a result of the inclusion of the measurement report response duration request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF TILE DRAWINGS

Embodiments of the present technology are illustrated by way of example and not by way of limitation, in the figures of the accompanying drawings and in which reference numerals refer to similar elements and in which.

DETAILED DESCRIPTION OF THE INVENTION

Figure 1:
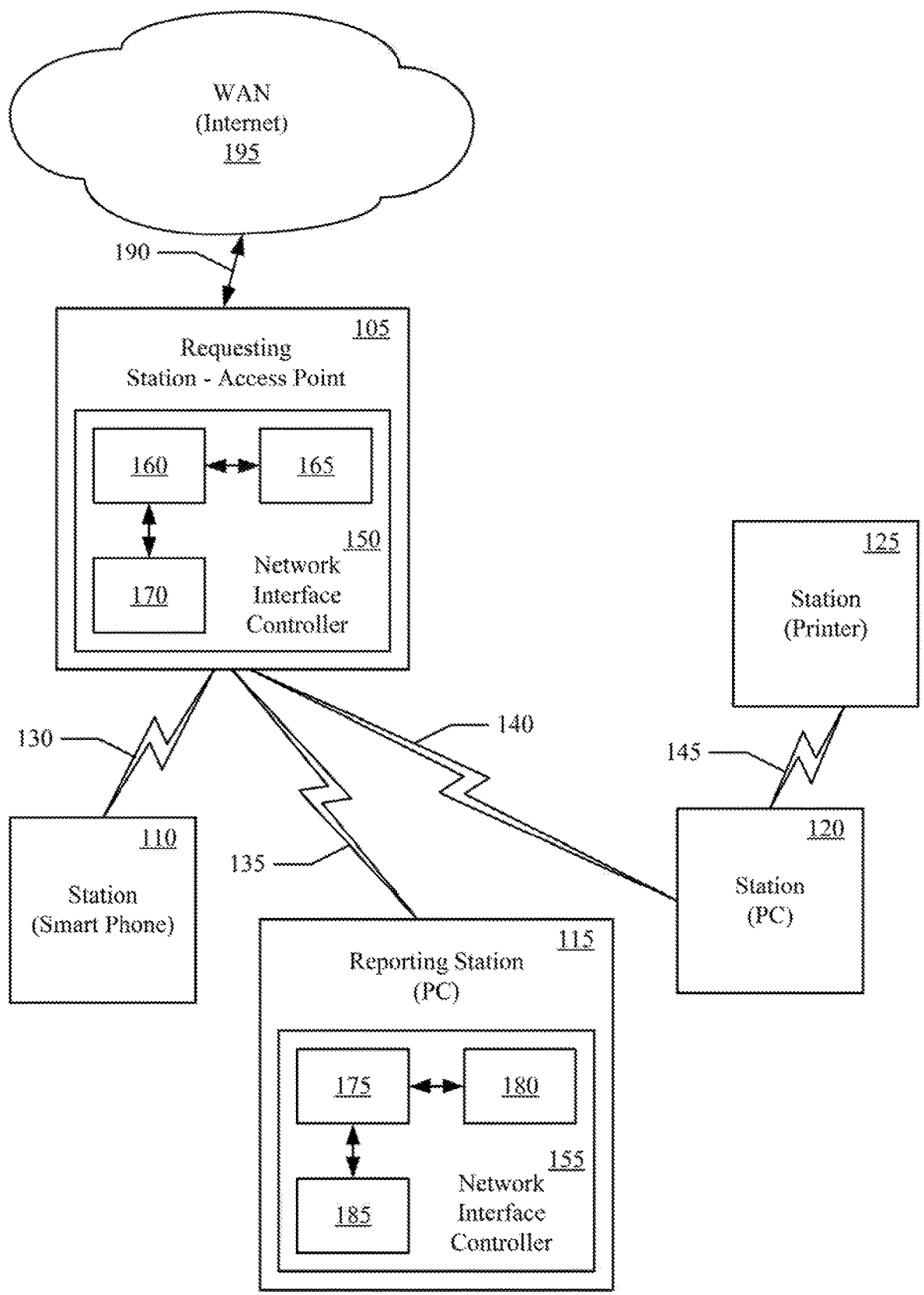
FIG. 1 shows a communication system, in accordance with aspects of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be to self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Referring to FIG. 1 a communication system, in accordance with aspects of the present technology, shown. The communication system 100 can include a plurality of stations (STA) 105-125 communicatively coupled together by one or more wireless communication links 130-145. The stations 105-130 can include a computing device in combination with a wireless network interface controller 150, 155. The computing devices can be any type of computing device, including but not limited to desktop Personal Computers (PCs), laptop PCs, tablet PCs, printers, smart phones, smart televisions, game consoles, infotainment systems, Internet of Thing (IOT) devices and the like. The network interface controller 150 can include one or more processors 160, one or more memories 165, and one or more transceivers 170. The memory 165 can store one or more computing device executable instructions and data that when processed by the one or processors 160 implement one or more functions performed by the stations 105-125 as described herein.

In one implementation, the one or more instructions and data can be read from memory 165 and executed by the one or more processors 160 to implement a Media Access Control (MAC) and Physical Layer (PRY) of the communication system. The wireless communication links 130-145 can be compliant with a specified wireless protocol standard. In one implementation, the wireless communication links 130-145 can be compliant with the Institute of Electrical and Electronics Engineering (IEEE) 802.11 standard, commonly referred to as Wi-Fi communication links 130-145.

One or more stations 105 can also be communicatively coupled 175 to one or more Wide Area Networks (WANs) 195 or the like. Stations 105 communicatively coupled to one or more WANs 195 by a wired communication link 190 can also be referred to as Access Points (AP). An access point can connect a group of stations to a wired network 195. The access point can be a standalone device or be integral with a computing device such as desktop PCs, laptop PCs, tablet PCs, smart phones, routers, modems and the like.

Figure 2A:
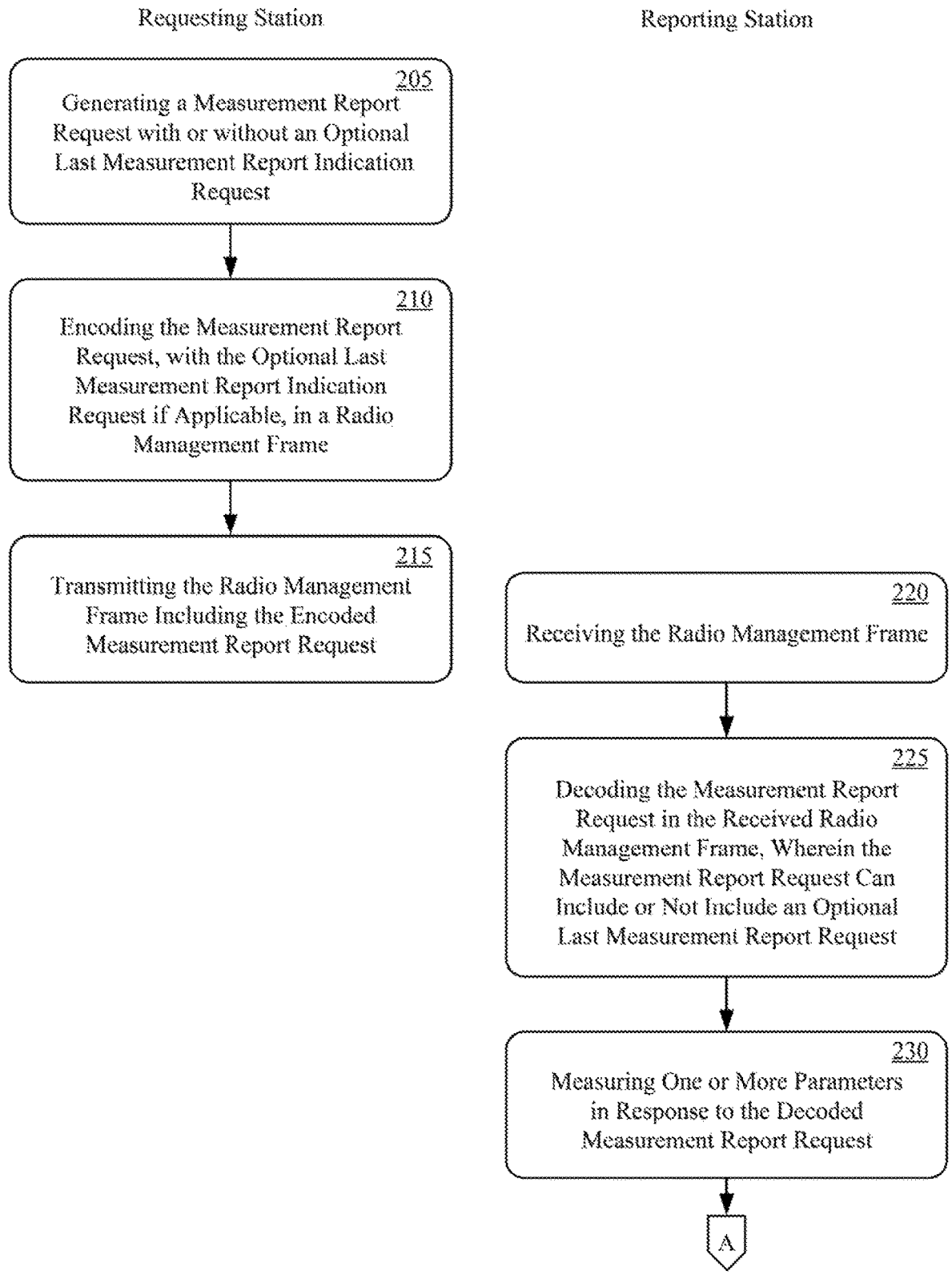
FIGS. 2A and 2B show a method of wireless communication, in accordance with aspect of the present technology.
Figure 2B:
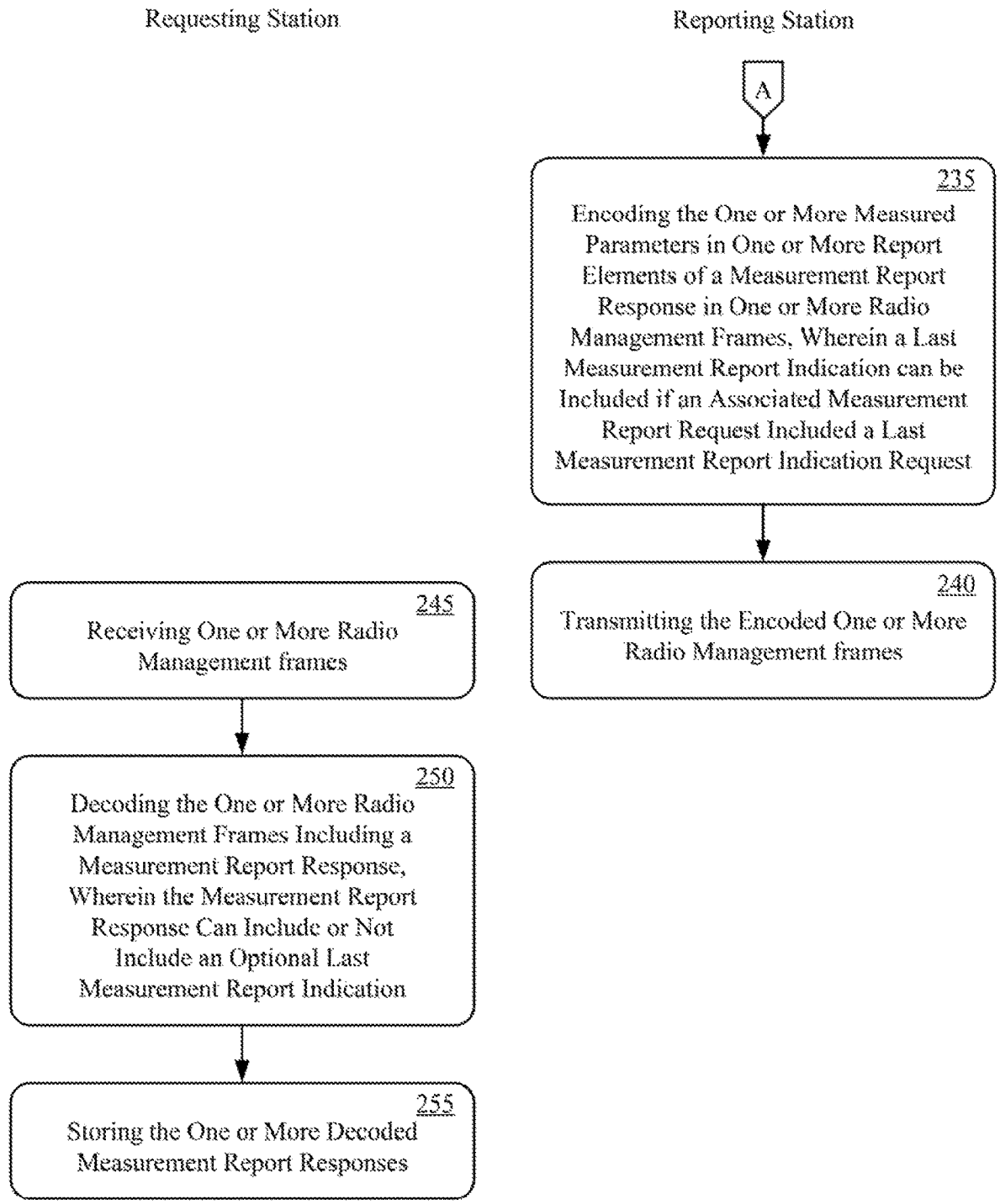

A requesting station 105 may request one or more wireless network measurements from one or more other stations 110-125. A reporting station 115 can reply with the one or more requested measurements. In one implementation, the requesting station 105 can be a WiFi Agile Multi-Band access point and the reporting station 115 can be a WiFi Agile Multi-Band Station non-access point station. Operation of the communication system, will be further described with reference to FIGS. 2A and 2B, which illustrates a method of wireless communication, in accordance with aspect of the present technology.

In aspects, the requesting station 105 can be configured to generating a measurement report request, at 205. The measurement report request can be a request for a beacon report, a spectrum report, a radio measurement report, a neighbor measurement report, a channel measurement report, a transmit stream measurement report, or the like. The generated measurement report request can optionally include a last measurement report indication request. The last measurement report indication request can be a given sub-element included in each measurement report request if a last measurement report indication is, desired, the requesting station 105 can set the given sub-element to a first value. If a last measurement report indication is not desired, or the reporting station does not support the feature, the requesting station 105 can set the given sub-element to a second value. In one implementation, the last measurement report indication request can be a last beacon report indication request included in the beacon report request. However, the requesting station can forgo requesting a last beacon report indication when the responding station is a legacy station that does not support the last beacon report indication functionality.

In one implementation, the measurement report request can be a beacon report request in accordance with the IEEE 802.11 standard. The beacon report request can be sent with a channel number, a measurement mode, a Basic Service Set Identifier (BSSID), air optional Service Set Identifier (SSID) sub-element, an optional Reporting Detail sub-element, one or more optional access point channel report sub-elements, and an optional request element. The channel number can be set to a specific channel along with an appropriate global operating class, or zero (0) along with the appropriate global operating class, or 255 along with one or more access point channel report sub-elements. The measurement mode can be set to active, passive, or beacon table. The Basic Service Set Identifier (BSSID) can be set to a specific BSSID or a wildcard BSSID. The optional Service Set Identifier (SSID) sub-element can be included with the SSID of the access points of interest, or omitted (e.g., implying a wildcard SSID). The optional reporting detail sub-element can be included and set to zero (0), or included and set to one (1), or included and set to two (2). The optional one or more access point channel report sub-elements can be included along with the appropriate global operating class if the channel number is set to 255, or may be omitted if the channel number is other than 255. The optional request element can be included and specify a list of element IDs, or it may be omitted.

In aspects, the measurement report request can be encoded in a Radio Management (RM) frame, at 210. In one implementation, a beacon report request can be encoded in radio management frame. If a last beacon report indication request is included, the last beacon report indication request can be encoded along with the beacon report request in the radio management frame. In one implementation, a last beacon report indication request can be encoded as a sub-element with a length field set to one (1). The sub-element identifier for the last beacon report indication request can be 164. When included in a beacon report request with the data field set to a value of one (1), the requesting station 105 is requesting that the reporting station 115 include an indication in a beacon report of the last frame of a sequence of one or more frames generated in response to the beacon report request.

In aspects, the radio management frame including the measurement report request can be transmitted from the requesting station 105 to one or more reporting stations 115 across one or more of the wireless communication links, at 215. In one implementation, the beacon report including the last beacon report indication request encoded in the radio management frame can be transmitted from the transceiver 170 of the requesting station 105 to the transceiver 185 of the reporting station 115 across the wireless communication link 135 coupling them. The radio management frame transmitted by the requesting station 105 can be received by the reporting station 115, at 220.

In aspects, a reporting station 115 can be configured to decode the radio management frame including the measurement report request, at 225. The measurement report request can optionally include the last measurement report indication request. In response to the measurement report request, the reporting station 115 can measure one or more parameters, at 230. In one implementation, the reporting station 115 can measure parameters of radio conditions for a predetermined period of time. The reporting station 115 can encode the one, or more measured parameters in one or more report elements of a measurement report response in one or more radio management frames, at 235. The one or more radio management frames can each include a last measurement report indication sub-element. In one implementation, the measurement report response can be a beacon report. In some implementations, one beacon report can be put in one radio measurement frame, and therefore multiple frames are sent to send multiple beacon reports. In other implementations, multiple beacon reports can be put in one radio measurement frame, and therefore there may not be a need to send multiple frames as a response to a beacon report request.

If the measurement report request included a last measurement report indication request, the given response element for indicating the last measurement report in a last one of the one or more radio management frames can be encoded with a first value to indicate the last measurement report. If the given radio management frame is not the last radio management frame, the given response element in the given radio management frame can be encoded with a second value to indicate that the given radio management frame is not the last radio management frame. In one implementation, a last beacon report indication can be included in a measurement report element. In one implementation, the last beacon report indication can be encoded in a new field of the measurement report element. In another implementation, the last beacon report indication can be added to individual measurement reports, as a new field added to each type of report, and the last report in the last frame indicating that it is the last report and therefore implicitly the last frame. In one implementation, a last beacon report indication can be encoded as sub-element with a length field set to one (1). The sub-element Identifier for the last beacon report indication can be 164. When included in a given response element of a beacon report with the data field set to a value of zero (0), the reporting station 115 is indicating that the beacon report including the given response element is not the last frame of the sequence of one or more frames generated in response to the beacon request. When included in a given response element of a beacon report with the data field set to a value of one (1), the reporting station 115 is indicating that the beacon report including the given response element is a last frame of a sequence of one or more frames generated in response to the beacon request In aspects, the one or more radio management frames including the measurement report response can be transmitted from the reporting station 115 to requesting station 105 across one or more of the wireless communication links, at 240. In one implementation, the beacon report including the last beacon report indication encoded in the radio management frame can be transmitted from the transceiver 185 of the reporting station 115 to the transceiver 170 of the requesting station 105 across the wireless communication link 135 coupling them.

The one or more radio management frames transmitted by the reporting station 115 can be received by the requesting station 105, at 245. In aspects, the requesting station 105 can decode one or more radio management frames including one or more measurement report responses, at 250. In one implementation, one or more beacon report responses of a beacon report can be decoded from one or more radio management frames. The beacon report response can include one or more measurement response elements. When a last beacon report indication sub-element is included in the one or more response elements, a response element set to a given value can identify the given measurement response as the last measurement response in the beacon report response.

In some implementations, the requesting station 105 may need to process and take action on the content of the measurement report response in a time sensitive manner. However, a conventional measurement report response can be de-prioritized so that other data such as user voice and video data can be sent, causing the measurement reports to be sent to the requester sporadically. In contrast, a last measurement report request can provide for determining when a complete measurement report response has been received by the requesting station 105. The requesting station 105 can therefore configure one or more parameters for communicating on one or more wireless communication links based on the one or more received measurement report elements as soon as it received the last measurement report frame, and does not need to wait to see if additional measurement report frames are to be received.

In aspects, the requesting station (STA) 105 can store the one or more decoded measurement report response in memory 165 for further processing related to the Media access control, Physical layer and/or one or more high communication stack layers, at 255. In one implementation, the requesting station 105 can configure one or more parameters for communicating on the one or more wireless communication links 130-145 based on the one or more received measurement report elements. For example, a Wi-Fi Agile Multiband access point can use the information in the beacon reports from associated Wi-Fi Agile Multiband stations as an input into an algorithm used to select a new channel for a Basic Service Set (BSS) or to request a BSS transition for any associated Wi-Fi Agile Multiband station.

Figure 3A:
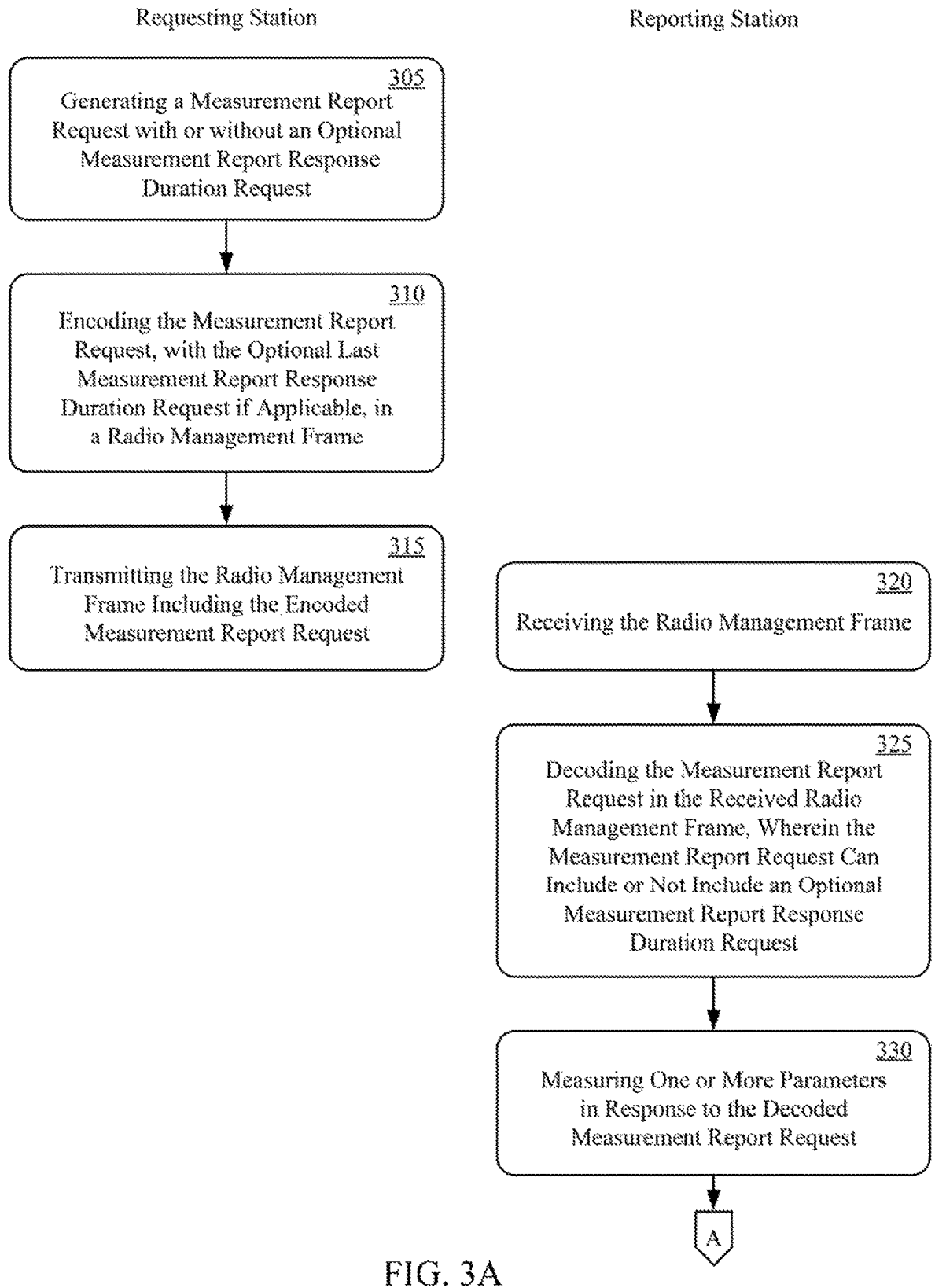
FIGS. 3A and 3B show a method of wireless communication, in accordance with aspect of the present technology.
Figure 3B:
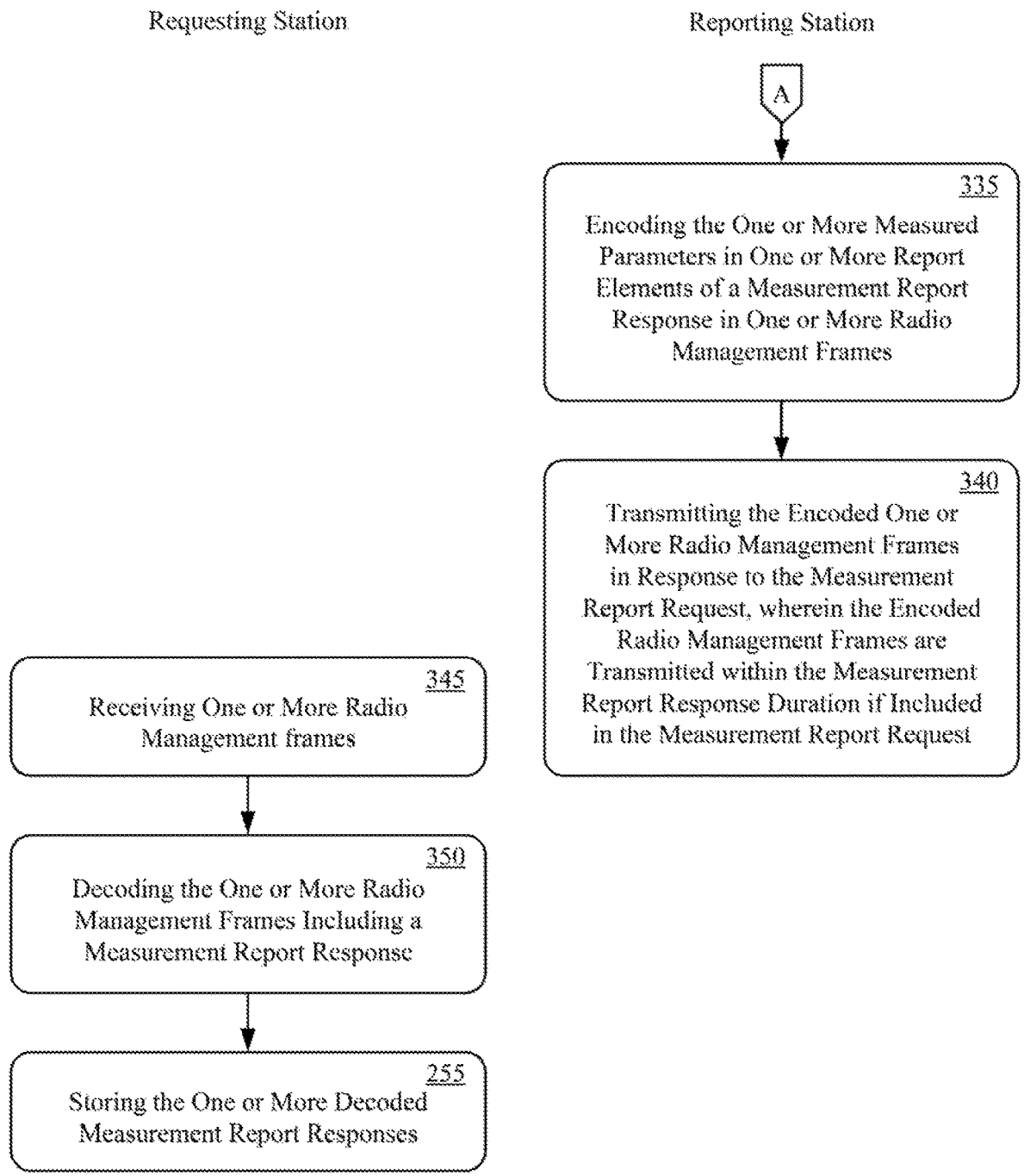

Referring now to FIGS. 3A and 3B, a method of wireless communication, in accordance with aspects of the present technology, is shown. In aspects, the requesting station 105 can be configured to generating a measurement report request, at 305. The measurement report request can be a request for a beacon report, a spectrum report, a radio measurement report, a neighbor measurement report, a channel measurement report, a transmit stream measurement report, or the like. The generated measurement report request can optionally include a measurement report response duration request. In one implementation, the measurement report indication Request can be a beacon report response duration request included in the beacon report request.

In one implementation, the measurement report request can be a beacon report request in accordance with the IEEE 802.11 standard. The beacon report request can be sent with a channel number, a measurement mode, a Basic Service Set Identifier (BSSID), an optional Service Set Identifier (SSID) sub-element, an optional Reporting Detail sub-element, one or more optional access point channel report sub-elements, and an optional request element. The channel number can be set to a specific channel along with an appropriate global operating class, or zero (0) along with the appropriate global operating class, or 255 along with one or more access point channel report sub-elements. The measurement mode can be set to active, passive, or beacon table. The Basic Service Set identifier (BSSID) can be set to a specific BSSID or a wildcard BSSID. The optional Service Set Identifier (SSID) sub-element can be included with the SSID of the access points of interest, or omitted (e.g., implying a wildcard SSID). The optional reporting detail sub-element can be included and set to zero (0), or included and set to one (1), or included and set to two (2). The optional one or more access point channel report sub-elements can be included along with the appropriate global operating class if the channel number is set to 255, or may be omitted if the channel number is other than 255. The optional request element can be included and specify a list of element IDs, or it may be omitted.

In aspects, the measurement report request can be encoded in a Radio Management (RM) frame, at 310. In one implementation, a beacon report request, can be encoded in the radio management frame. If a beacon report response duration request is included, the beacon report response duration request can be encoded along with the beacon report request in the radio management frame. In one implementation, a beacon report response duration request can be encoded as a sub-element. The sub-element identifier for the beacon report response duration request can be 164. The beacon report response duration request can be encoded as a number of durations units. The number of duration units can be, for example, the number of a given clock cycle.

In aspect, the radio management frame including the measurement report request can be transmitted from the requesting station 105 to one or more reporting stations 115 across one or more of the wireless communication links, at 315. In one implementation, the beacon report including the beacon report response duration request encoded in the radio management frame can be transmitted, from the transceiver 170 of the requesting station 105 to the transceiver 185 of the reporting station 115 across the wireless communication link 135 coupling them. The radio management frame transmitted by the requesting station 105 can be received by the reporting station (STA) 115, at 220.

In aspects, a reporting station 115 can be configured to decode the radio management frame including the measurement report request, at 325. The measurement report request can optionally include the measurement report response duration request. In response to the measurement report request, the reporting station 115 can measure one or more parameters, at 330. In one implementation, the reporting station 115 can measure parameters of radio conditions for a predetermined period of time. The reporting station 115 can encode the one or more measured parameters in one or more report elements of a measurement report response in one or more radio management frames, at 335. In one implementation, the measurement report response can be a beacon report. In some implementations, one beacon report can be put in one radio measurement frame, and therefore multiple frames can be sent to send multiple beacon reports. In other implementations, multiple beacon reports can be put in one radio measurement frame, and therefore there may not be a need to send multiple frames as a response to a beacon report request.

In aspects, the radio management frame including the measurement report response can be transmitted from the reporting station 115 to requesting station 105 across one or more of the wireless communication links, at 340. If the measurement report duration request included a measurement response duration request, the encoded one or more radio management frames can be transmitted within the requested measurement report duration. In one implementation, the beacon report encoded in the one or more radio management frames can be transmitted within the requested measurement report duration from the transceiver 185 of the reporting station 115 to the transceiver 170 of the requesting station 105 across the wireless communication link 135 coupling them.

The one or more radio management frames transmitted by the reporting station 115 can be received by the requesting station 105, at 345. In aspects, the requesting station 105 can decode one or more radio management frames including one or more measurement report responses, at 350. In one implementation, one or more beacon report responses of a beacon report can be decoded from one or more radio management frames. The beacon report response can include one or more measurement response elements.

In some implementations, the requesting station 105 may need to process and take action on the content of the measurement report response in a time sensitive manner. However, conventional measurement report responses can be de-prioritized so that other data such as user voice and video data can be sent. In contrast, a measurement report response duration request can provide the delivering the measurement report response to the requesting station 105 within a predetermined period of time so that the requesting station can timely process and take action on the content of the measurement report response.

In aspects, the requesting station 105 can store the one or more decoded measurement report response in memory 165 for further processing related to the Media access control, Physical layer and/or one or more higher communication stack layers, at 255. In one implementation, the requesting station 105 can configure one or more parameters for communicating on the one or more wireless communication links 130-145 based on the one or more received measurement report elements. For example, a Wi-Fi Agile Multiband access point can use the information in the beacon reports from associated Wi-Fi Agile Multiband stations as an input into an algorithm used to select a new channel for a Basic Service Set (BSS) or to request a BSS transition for any associated Wi-Fi Agile Multiband station.

Figure 4A:
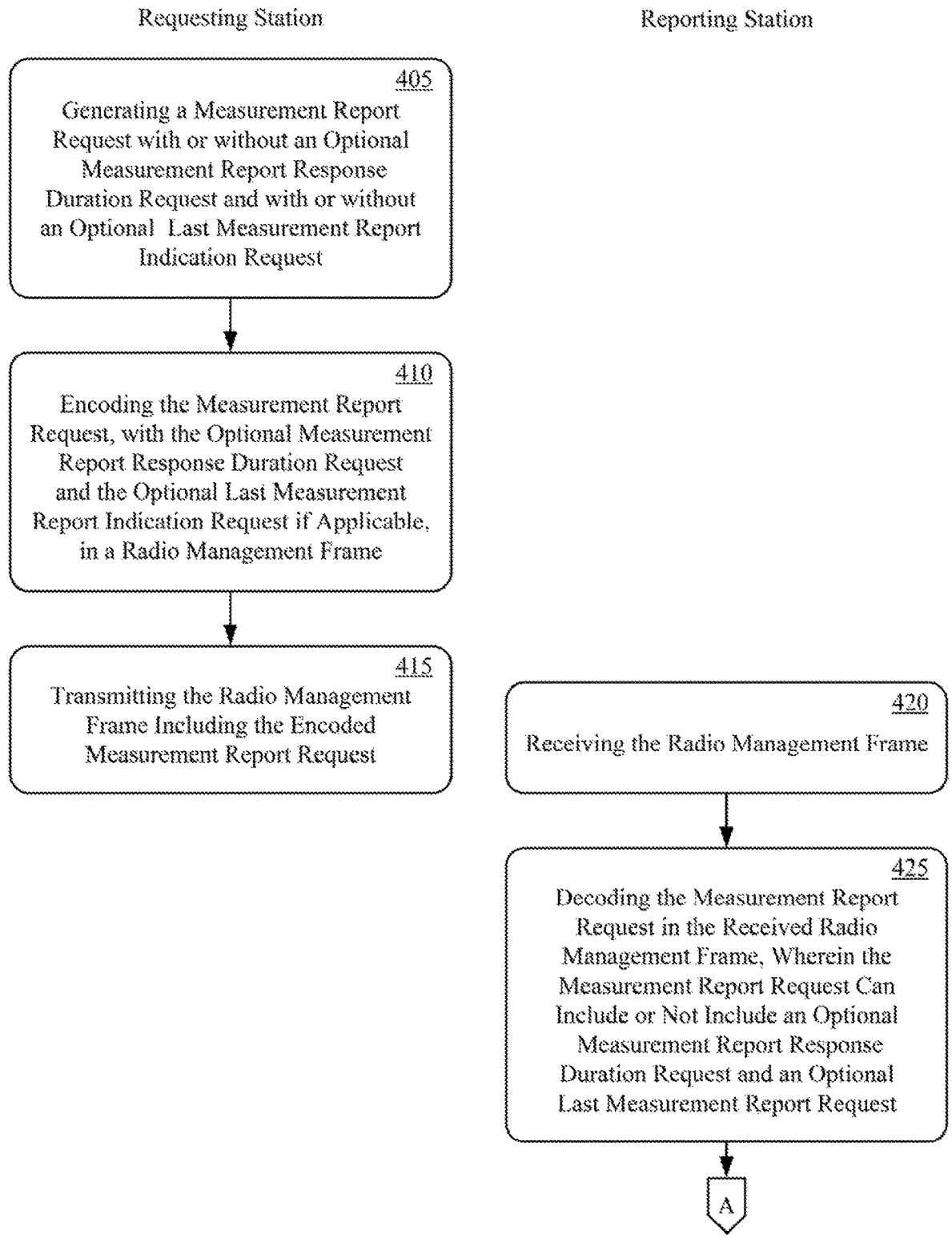
FIGS. 4A-4C show a method of wireless communication, in accordance with aspect of the present technology.
Figure 4B:
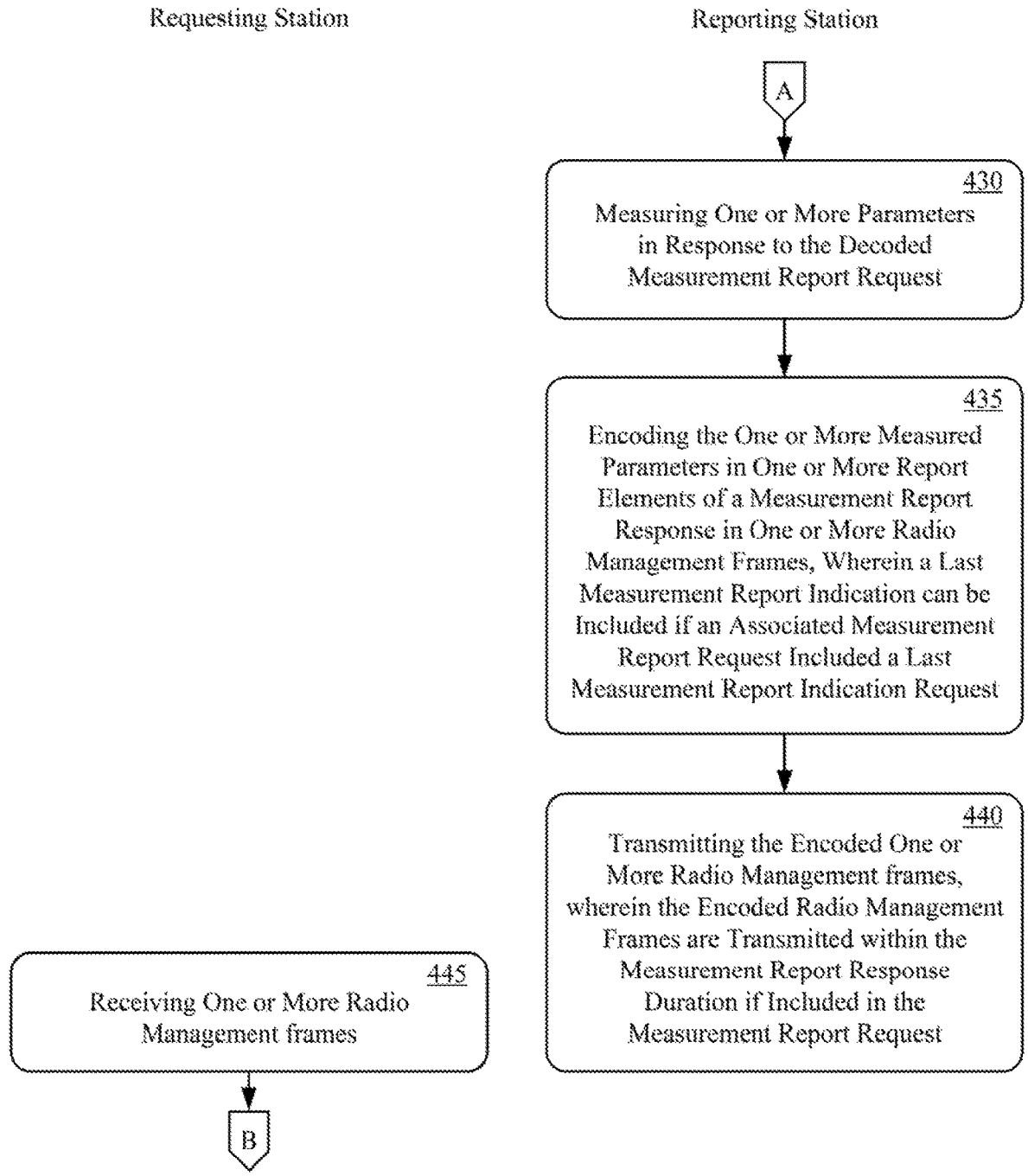
Figure 4C:
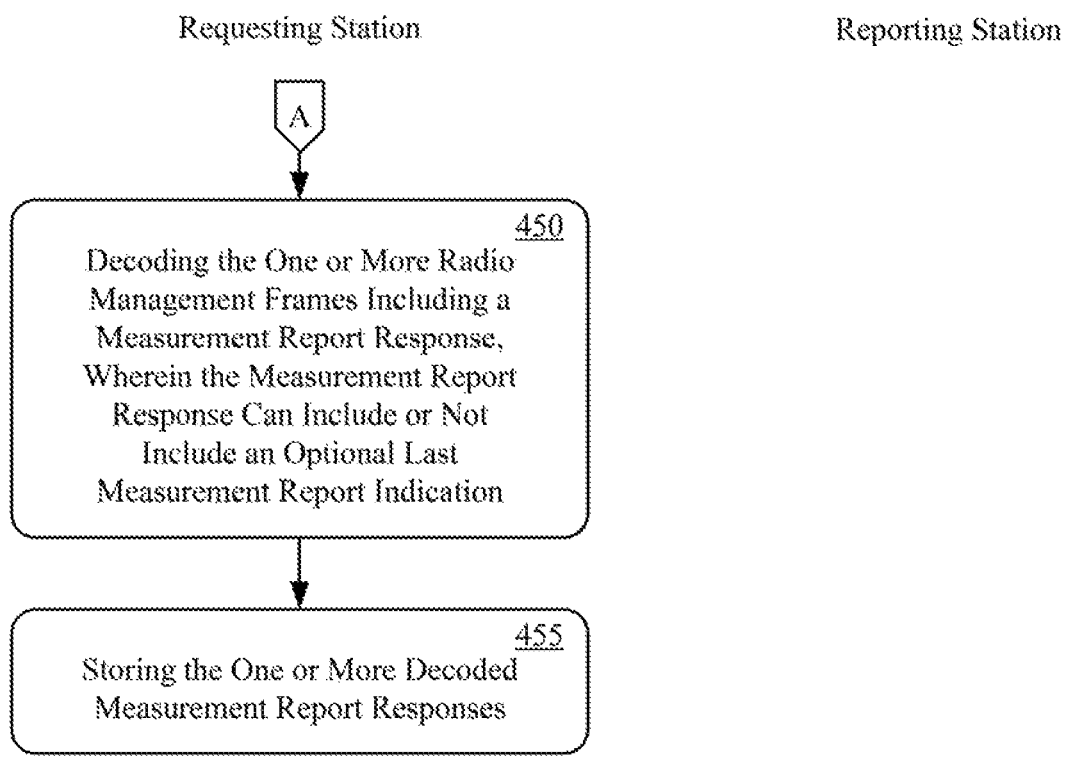

Referring now to FIGS. 4A-4C, a method of wireless communication, in accordance with aspect of the present technology, is shown. In aspects, the requesting station 105 can be configured to generating a measurement report request, at 405. The measurement report request can be a request for a beacon report, a spectrum report, a radio measurement report, a neighbor measurement report, a channel measurement report, a transmit stream measurement report, or the like. The generated measurement report request can optionally include a measurement report response duration request and a last measurement report indication request. In one implementation, the measurement report response duration request and the last measurement report indication request can be a beacon report response duration request and a last beacon report indication request included in the beacon report request.

In one implementation, the measurement report request can be a beacon report request in accordance with the IEEE 802.11 standard. The beacon report request can be sent with a channel number, a measurement mode, a Basic Service Set Identifier (BSSID), an optional Service Set Identifier (SSID) sub-element, an optional Reporting Detail sub-element, one or more optional access point channel report sub-elements, and an optional request element. The channel number can be set to a specific channel along with an appropriate global operating class, or zero (0) along with the appropriate global operating class, or 255 along with one or more access point channel report sub-elements. The measurement mode can be set to active, passive, or beacon table. The Basic Service Set Identifier (BSSID) can be set to a specific BSSID or a wildcard BSSID. The optional Service Set Identifier (SSID) sub-element can be included with the SSID of the access points of interest, or omitted (e.g., implying, a wildcard SSID). The optional reporting detail sub-element can be included and set to zero (0), or included and set to one (1), or included and set to two (2). The optional one or more access point channel report sub-elements can be included along with the appropriate global operating class if the channel number is set to 255, or may be omitted if the channel number is other than 255. The optional request element can be included and specify a list of element IDs, or it may be omitted.

In aspects, the measurement report request can be encoded in a Radio Management (RM) frame, at 410. In one implementation, a beacon report request can be encoded in radio management frame. The beacon report response duration request and the last beacon report indication request can be encoded along with the beacon report request in the radio management frame. In one implementation, a beacon report response duration request can be encoded as one sub-element. In one implementation, a last beacon report indication request can be encoded as another sub-element with a length field set to one (1). If a beacon report response duration and a last beacon report indication request is not included, the corresponding sub-elements can be encoded with a value of zero (0).

In aspect, the radio management frame including the measurement report request can be transmitted from the requesting station 105 to one or more reporting stations 115 across one or more of the wireless communication links, at 415. In one implementation, the beacon report including the beacon report response duration request and the last beacon report indication request encoded in the radio management frame can be transmitted from the transceiver 170 of the requesting station 105 to the transceiver 185 of the reporting station 115 across the wireless communication link 135 coupling them. The radio management frame transmitted by the requesting station 105 can be received by the reporting station 115, at 420.

In aspects, a reporting station 115 can be configured to decode the radio management frame including the measurement report request, at 425. The measurement report request can optionally include the measurement report response duration request and the last measurement report indication request. In response to the measurement report request, the reporting station 115 can measure one or more parameters, at 430. In one implementation, the reporting station 115 can measure parameters of radio conditions for a predetermined period of time. The reporting station 115 can encode the one or more measured parameters in one or more report elements of a measurement report response in one or more radio management frames, at 435. In one implementation, the measurement report response can be a beacon report. In some implementations, one beacon report can be put in one radio measurement frame, and therefore multiple frames are sent to send multiple beacon reports. In other implementations, multiple beacon reports can be put in one radio measurement frame, and therefore there may not be a need to send multiple frames as a response to a beacon report request.

If the measurement report request included a last measurement report indication request, a given response element in a last one of the one or more radio management frames can be encoded to include a last measurement report indication. In one implementation, a last beacon report indication can be included in a measurement report element. In one implementation, the last beacon report indication can be encoded in a new field of the measurement report element. In another implementation, the last beacon report indication can be added to individual measurement reports, as a new field added to each type of report, and the last report indicating that it is the last report and therefore implicitly the last frame. In one implementation, a last beacon report indication can be encoded as a sub-element with a length field set to one (1). The sub-element Identifier for the last beacon report indication can be 164. When included in a given response element of a beacon report with the data field set to a value of one (1), the reporting station 115 is indicating that the beacon report including the given response element is a last frame of a sequence of one or more frames generated in response to the beacon request. If the beacon report request does not include a last beacon, report indication request, the data field of the last Beacon Report Indicator can be set to a value of zero (0).

In aspects, the one or more radio management frames including the measurement report response can be transmitted from the reporting station 115 to requesting station 105 across one or more of the wireless communication links, at 440. If the measurement report duration request included a measurement response duration request, the encoded one or more radio management frames can be transmitted within the requested measurement report duration. In one implementation, the beacon report including the last beacon report indication encoded in the radio management frame can be transmitted within the requested measurement report duration from the transceiver 185 of the reporting station 115 to the transceiver 170 of the requesting station 105 across the wireless communication link 135 coupling them.

The one or more radio management frames transmitted by the reporting station 115 can be received by the requesting station 105, at 445. In aspects, the requesting station 105 can decode one or more radio management frames including one or more measurement report responses, at 450. In one implementation, one or more beacon report responses of a beacon report can be decoded from one or more radio management frames. The beacon report response can include one or more measurement response elements. When set in a given response element, a last beacon report indication identifies the given measurement response elements as the last measurement response in the beacon report response.

In some implementations, the requesting station 105 may need to process and take action on the content of the measurement report response in a time sensitive manner. However, a conventional measurement report response can be de-prioritized so that other data such as user voice and video data can be sent. In contrast, a measurement report response duration request can provide for delivering the measurement report response to the requesting station 105 within a predetermined period of time. In addition, a last measurement report request can provide for determining when a complete measurement report response has been received by the requesting station 105. The requesting station 105 can therefore configure one or more parameters for communicating on one or more wireless communication links based on the one or more received measurement report elements as soon as it received the last measurement report frame, and does not need to wait to see if additional measurement report frames are to be received.

In aspects, the requesting station 105 can store the one, or more decoded measurement report response in memory 165 for further processing related to the Media access control, Physical layer and/or one or more high communication stack layers, at 455. In one implementation, the requesting station 105 can configure one or more parameters for communicating on the one or more wireless communication links 130-145 based on the one or more received measurement report elements. For example, a Wi-Fi Agile Multiband access point, can use the information in the beacon reports from associated Wi-Fi Agile Multi and stations as an input into an algorithm used to select a new channel for a Basic Service Set (BSS) or to request a BSS transition for any associated Wi-Fi Agile Multiband station.

Aspects of the present technology advantageously enable a wireless station to make quick radio management decisions. The requesting station can advantageously receive radio management measurement parameters within a requested time period and/or can determine when the last requested radio management measurement parameter has been received.

The descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A requesting station to wirelessly communicate data, the requesting station comprising:
   one or more processors that execute instructions to:
      generate a measurement report request along with a request for a last measurement report indication, wherein a last measurement report indication identifies a last one of one or more radio management frames encoding a measurement report; and
      encode the measurement report request along with the request for the last measurement report indication in a radio management frame;
   one or more transmitters to transmit the encoded radio management frame;
   one or more memories to store one or more instructions and data that when executed by the one or more processors generate the measurement report request;
   one or more receivers to receive one or more radio management frames; and the one or more processors that execute instructions further to decode the received one or more radio management frames including one or more measurement report responses, wherein the last measurement report indication is included in a given measurement report response.

2. The requesting station of claim 1, further comprising:
the one or more processors that execute instructions further to:
generate the measurement report request along with a request for a measurement report response duration and the request for the last measurement report indication; and
encoding the measurement report request along with the request for the measurement report response duration and the request for the last measurement report indication in the radio management frame.

3. The requesting station of claim 1, wherein the request for the last measurement report indication is encoded as a given sub-element with a length field of one (1) of the measurement report request.

4. The requesting station of claim 3, wherein:
the given sub-element with a value of one (1) in the measurement report request indicates a presence of the request for the last measurement report indication; and
the given sub-element with a value of zero (0) in the measurement report request indicates an absence of the request for the last measurement report indication.

5. The requesting station of claim 1, wherein the requesting station comprises an access point.

6. The requesting station of claim 1, wherein the measurement report request comprises one of a beacon report, a spectrum report, a radio measurement report, a neighbor measurement report, a channel measurement report, and a transmit stream measurement report.

7. A reporting station to wirelessly communicate data, the reporting station comprising:
one or more receivers that receive a radio management frame;
one or more processor that execute instructions to:
decode a measurement report request along with a request for a last measurement report indication from the received radio management frame;
measure one or more parameters in response to the decoded measurement report request; and
encode the one or more measured parameters in one or more report elements of a measurement report response in one or more radio management frames, wherein a given report element in the one or more radio management frames includes a last measurement report indication set to a first value in a last one of the one or more radio management frames and set to a second value in the one or more radio management frames that are not the last one of the one or more radio management frames;
one or more transmitters to transmit the encoded one or more radio management frames;
the one or more receivers to receive one or more radio management frames; and
the one or more processors that execute instructions further to decode the received one or more radio management frames from a given responding station until a given measurement response includes the last measurement report indication.

8. The reporting station of claim 7, wherein:
the one or more processors that execute the instruction further to:
decode the measurement report request along with a request for a measurement report response duration and the request for the last measurement report indication from the received radio management frame; and
the one or more transmitters to transmit the encoded one or more radio management frames within a duration of the measurement report response duration request.

9. The reporting station of claim 7, wherein a presence or absence of the last measurement report indication is encoded in a field of the given report element.

10. The reporting station of claim 7, wherein a presence or absence of the last measurement report indication is encoded in a field of a report of the radio management frame.

11. The reporting station of claim 7, wherein each report element in the one or more radio management frames includes a field configurable to encode a presence or absence of the last measurement report indication.

12. The reporting station of claim 7, wherein each type of measurement reports includes a field configurable to encode a presence or absence of the last measurement report indication.

13. A method of wirelessly communicating data comprising:
generating, at a requesting station, a measurement report request including an element indicating a presence or absence of a request for a last measurement report indication, wherein a last measurement report indication identifies a last one of one or more radio management frames encoding a measurement report;
encoding, at the requesting station, the measurement report request along with the element indicating the presence or absence of the request for the last measurement indication in a radio management frame;
transmitting, from the requesting station, the encoded radio management frame;
receiving, at the requesting station, one or more radio management frames in response to radio management frame transmitted from the requesting station;
decoding, at the requesting station, the one or more received radio management frames until a given measurement response in the decoded one or more received radio management frames includes the last measurement report indication, wherein the one or more radio management frames includes one or more measurement report responses, and wherein the last measurement report indication is included in a given measurement report response; and
configuring, at the requesting station, one or more parameters for communicating on one or more wireless communication links based on the one or more measurement report responses.

14. The method according to claim 13, further comprising:
receiving, at a reporting station, the encoded radio management frame;
decoding, at the reporting station, a measurement report request with the request for the last measurement report indication from the received radio management frame;
measuring, at the reporting station, one or more parameters in response to the decoded measurement report request;
encoding, at the reporting station, the one or more measured parameters in one or more report elements of a measurement report response in one or more radio management frames, wherein a given report element in the one or more radio management frames includes the last measurement report indication set to a first value in a last one of the one or more radio management frames and set to a second value in the one or more radio management frames that are not the last one of the one or more radio management frames; and transmitting, by the reporting station, the encoded one or more radio management frames.

15. The method according to claim 14, wherein:

the measurement report comprises a beacon report; and the last measurement report indication comprises a last beacon report indication, wherein a given sub-element of the last beacon report indication with a value of one (1) indicates a presence of the last beacon report indication and a value of zero (0) indicates an absence of the last beacon report indication.

\* \* \* \* \*